United States Patent
Hakanson et al.

(10) Patent No.: US 10,224,066 B1
(45) Date of Patent: Mar. 5, 2019

(54) ELECTRICAL ISOLATION OF READ SENSORS DURING FABRICATION

(71) Applicant: Seagate Technology LLC, Cupertino, CA (US)

(72) Inventors: Andrew J. Hakanson, Chanhassen, MN (US); Robbee L. Grimm, Lakeville, MN (US); Greg A. Schmitz, Princeton, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/824,317

(22) Filed: Nov. 28, 2017

(51) Int. Cl.
| G11B 5/39 | (2006.01) |
| G11B 5/31 | (2006.01) |
| G11B 5/40 | (2006.01) |
| G11B 5/33 | (2006.01) |

(52) U.S. Cl.
CPC ............ *G11B 5/3109* (2013.01); *G11B 5/313* (2013.01); *G11B 5/3133* (2013.01); *G11B 5/332* (2013.01); *G11B 5/40* (2013.01)

(58) Field of Classification Search
CPC ....... G11B 5/313; G11B 5/3133; G11B 5/332; G11B 5/40
USPC .................................................. 360/313, 323
See application file for complete search history.

(56) References Cited

U.S. PATENT DOCUMENTS

| 6,212,047 | B1 | 4/2001 | Payne et al. | |
| 6,320,725 | B1 | 11/2001 | Payne et al. | |
| 6,415,500 | B1 * | 7/2002 | Han | B82Y 10/00 29/603.14 |
| 6,989,960 | B2 * | 1/2006 | Dugas | G11B 5/1276 29/603.15 |
| 7,145,187 | B1 * | 12/2006 | Vashchenko | H01L 27/0262 257/173 |
| 7,474,513 | B1 * | 1/2009 | Nibarger | B82Y 10/00 360/323 |
| 7,587,809 | B2 | 9/2009 | Dimitrov et al. | |
| 8,922,952 | B2 | 12/2014 | McGeehin et al. | |
| 8,922,954 | B2 | 12/2014 | Cao et al. | |
| 9,099,123 | B1 | 8/2015 | Wagatsuma et al. | |
| 2002/0067579 | A1 | 6/2002 | Sato | |
| 2002/0097532 | A1 * | 7/2002 | Voldman | G11B 5/3103 360/323 |
| 2006/0044702 | A1 * | 3/2006 | Ding | B23K 1/0056 360/323 |

(Continued)

*Primary Examiner* — Jefferson A Evans
(74) *Attorney, Agent, or Firm* — Westman, Champlin & Koehler, P.A.

(57) ABSTRACT

A method includes depositing a plurality of layers over a substrate. The layers include read sensor layers and an electrically conductive layer substantially coplanar with the read sensor layers and substantially surrounding the read sensor layers. The electrically conductive layer is in contact with at least one of the read sensor layers. The electrically conductive layer provides an electrical path between the at least one of the read sensor layers and ground. The method further includes forming an isolation structure around the read sensor layers by removing a portion of the electrically conductive layer substantially surrounding the read sensor layers. The isolation structure is substantially coplanar with the read sensor layers and substantially surrounds the read sensor layers. The isolation structure breaks the electrical path between the at least one of the read sensor layers and the ground.

17 Claims, 7 Drawing Sheets

(56) References Cited

U.S. PATENT DOCUMENTS

| | | | | |
|---|---|---|---|---|
| 2007/0097557 A1* | 5/2007 | Seagle | ............... | G11B 5/3163 360/323 |
| 2007/0217078 A1* | 9/2007 | Neumann | ............ | G11B 5/3958 360/316 |
| 2009/0168262 A1* | 7/2009 | Wallash | ................ | G11B 5/11 360/323 |
| 2017/0236539 A1* | 8/2017 | Biskeborn | .......... | G11B 5/00821 360/122 |

* cited by examiner

ELECTRICAL ISOLATION OF READ SENSORS DURING FABRICATION

BACKGROUND

Data storage devices, such as disc drives, use magnetic recording heads to read and/or write data on magnetic storage media, such as a data storage discs. In a typical disc drive, one or more discs are mounted on a spindle motor, which causes the disc(s) to spin. Recording heads carried by a slider are used to read from and write to data tracks on the disc(s). The slider is typically carried by a head arm assembly that includes an actuator arm and a suspension assembly. During operation, as the disc spins, the slider glides above the surface of the disc on a small cushion of air or gas and the actuator arm pivots to movably position the slider with respect to the disc.

As areal recording densities for storage discs increase, technological advances and changes to various components of the disc drives are needed.

SUMMARY

The present disclosure relates to a technique for electrically isolating read sensors during fabrication of the read sensors.

In one embodiment, a method includes depositing a plurality of layers over a substrate. The layers include read sensor layers and an electrically conductive layer substantially coplanar with the read sensor layers and substantially surrounding the read sensor layers. The electrically conductive layer is in contact with at least one of the read sensor layers. The electrically conductive layer provides an electrical path between the at least one of the read sensor layers and ground. The method further includes forming an isolation structure around the read sensor layers by removing a portion of the electrically conductive layer substantially surrounding the read sensor layers. The isolation structure is substantially coplanar with the read sensor layers and substantially surrounds the read sensor layers. The isolation structure breaks the electrical path between the at least one of the read sensor layers and the ground.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the disclosure relate to electrically isolating reader sensors during fabrication of the read sensors. However, prior to providing additional details regarding the different embodiments, a description of an illustrative operating environment is provided below.

Figure 1:
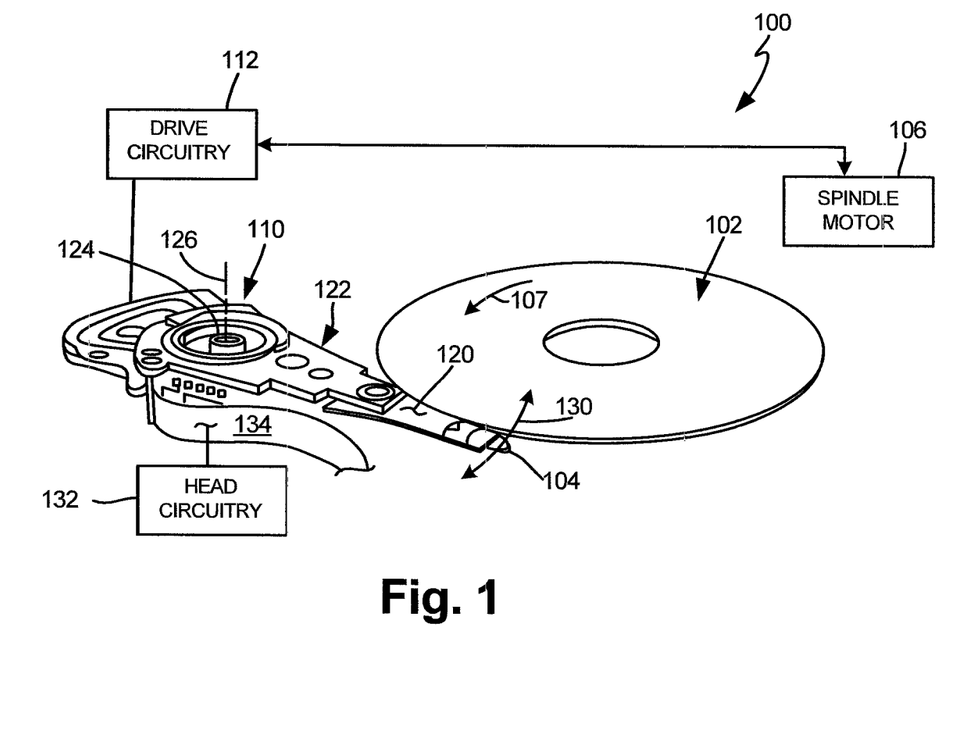
FIG. 1 illustrates an embodiment of a data storage device in which embodiments of the present application can be used.

FIG. 1 shows an illustrative operating environment in which certain reader embodiments formed as disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a schematic illustration of a data storage device 100 including a data storage medium and a head for reading data from and writing data to the data storage medium. As shown in FIG. 1, the data storage device 100 includes a data storage medium or disc 102, which may be a magnetic storage disc, and a head 104. The head 104 including transducer elements (not shown in FIG. 1) is positioned above the data storage medium 102 to read data from and write data to the data storage medium 102. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The transducer elements of the head 104 are coupled to head circuitry 132 through flex circuit 134, also known as printed circuit cable assembly (PCCA), to encode and/or decode data. Although FIG. 1 illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 2:
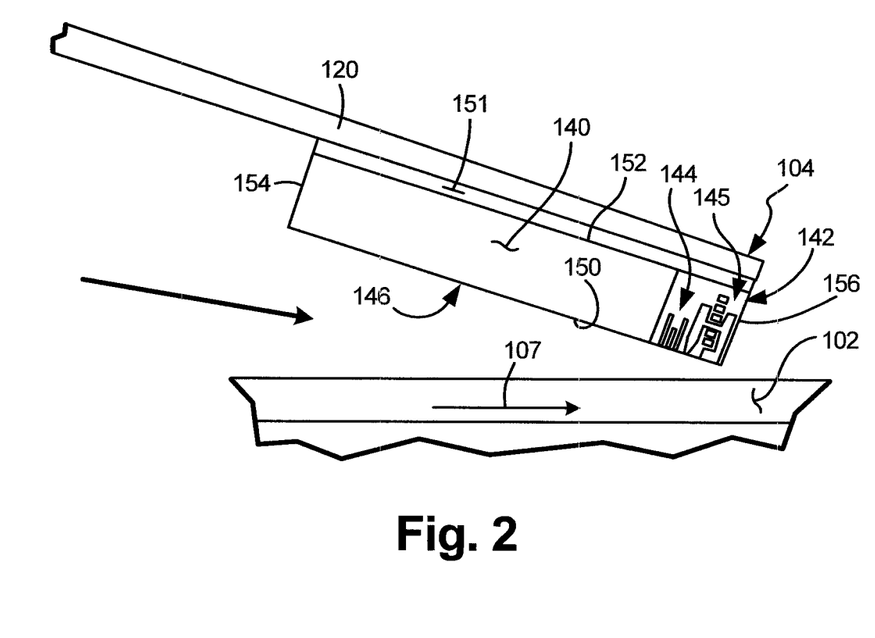
FIG. 2 is a schematic illustration of a head including one or more transducer elements above a magnetic recording medium.

FIG. 2 is a detailed illustration (side view) of the head 104 above the medium 102. The transducer elements on the head 104 are fabricated on a slider 140 to form a transducer portion 142 of the head 104. The transducer portion 142 shown in FIG. 2 includes a read element 144 and a write element 145. Alternatively, the head 104 may be a head exclusively for reading that includes only the read element 144 and no write element 145.

As shown, the head 104 includes a bearing surface (for example, an air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air or gas flow in direction 107 as shown in FIG. 2 along the ABS 146 of the slider 140 from a leading edge 154 to the trailing edge 156 of the slider 140 or head 104. Air or gas flow along the bearing surface 146 creates a pressure profile to support the head 104 and slider 140 above the medium 102 for read and write operations. As shown, the transducer portion 142 is formed at or near the trailing edge 156 of the slider 140. A description of a general embodiment for forming of a transducer portion such as 142 on a wafer is provided below in connection with FIG. 3. Thereafter, details regarding specific embodiments are provided.

Figure 3:
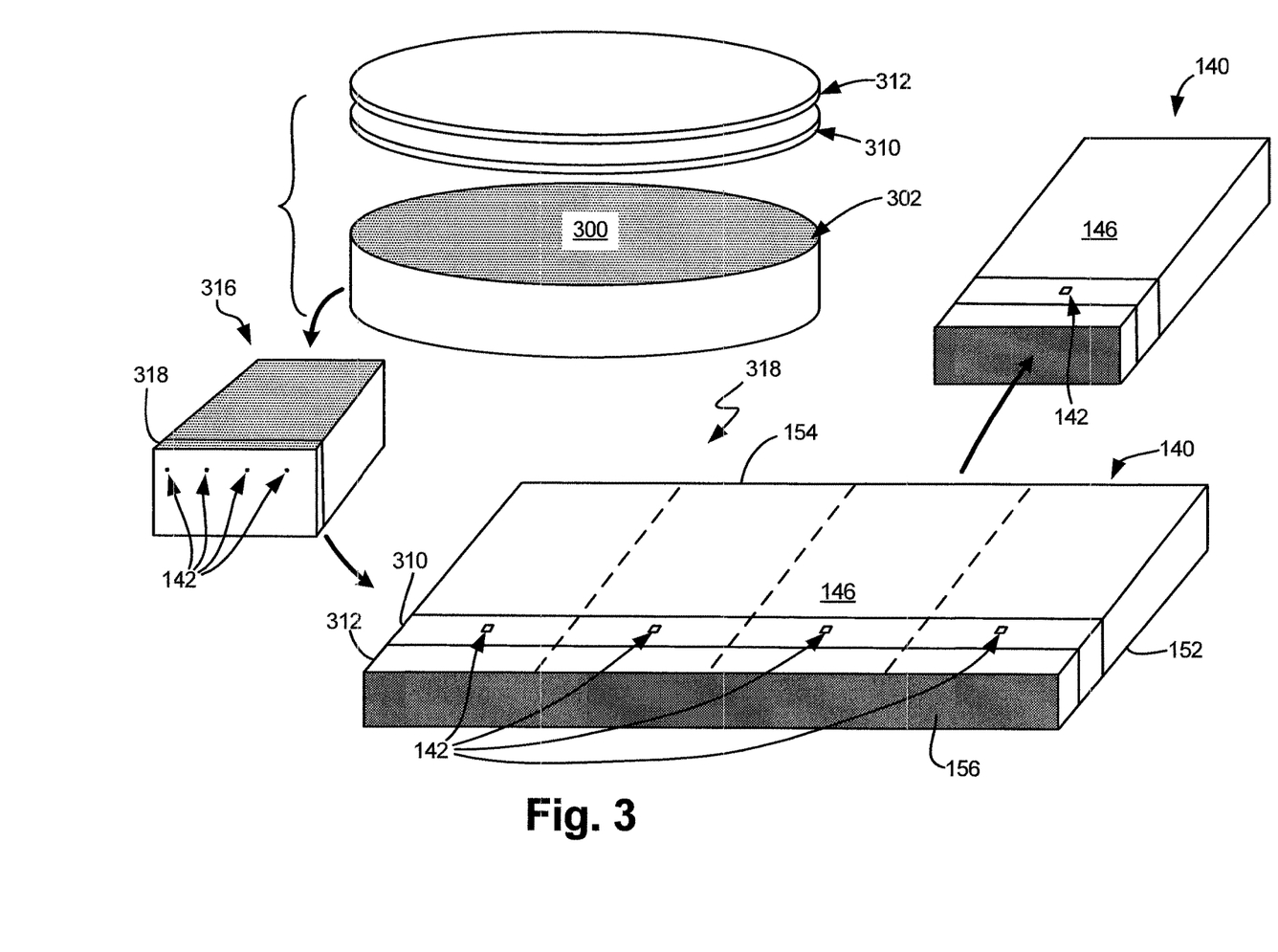
FIG. 3 is a schematic illustration of a wafer fabrication sequence for heads of a data storage device.

FIG. 3 is a schematic illustration of a wafer fabrication sequence for heads of a data storage device. As shown in FIG. 3, multiple thin film deposition layers are deposited on a surface 300 of a wafer or substrate 302 to form transducer elements 142 (illustrated schematically in FIG. 3). As shown, the multiple deposition layers may include read element layers 310 and write element layers 312. The read and write element layers 310, 312 are illustrated schematically in FIG. 3. Following deposition of the read and write element layers 310, 312, the wafer 302 is sliced into a bar chunk 316. The bar chunk 316 includes a plurality of slider bars 318 (one slider bar 318 is shown exploded from the chunk 316).

The sliced bars 318 have a leading edge 154, a trailing edge 156, a bearing surface 146 and a back surface 152. After the bars 318 are sliced from chunks 316, the transducer elements 142 (read and write elements) deposited on the wafer 302 are orientated along the bearing surface 146 at the trailing edge 156 of the slider bar 318. The slider bar 318 is sliced to form the sliders 140. Typically, the bar 318 is lapped and the bearing surface(s) 146 are etched prior to slicing the bar 318 to form the individual sliders 140.

Illustratively, the wafer 302 is formed of a ceramic material such as alumina ($Al_2O_3$)-titanium carbide (Ti—C). The read and write elements are fabricated on the ceramic or substrate material of the wafer 302 to form a slider body 140 of the head, and the deposition layers 310, 312 form the transducer elements 142 proximate to the trailing edge 156 of the slider body 140. It should be noted that a fabrication process for heads to be used exclusively for reading would not include write element layers 312.

Embodiments of the disclosure relate to electrically isolating read sensors during fabrication of the read sensors at a stage prior to the slicing a wafer 302 with layers 310 into a bar chunk 316. Details regarding the embodiments are provided below.

Figure 4A:
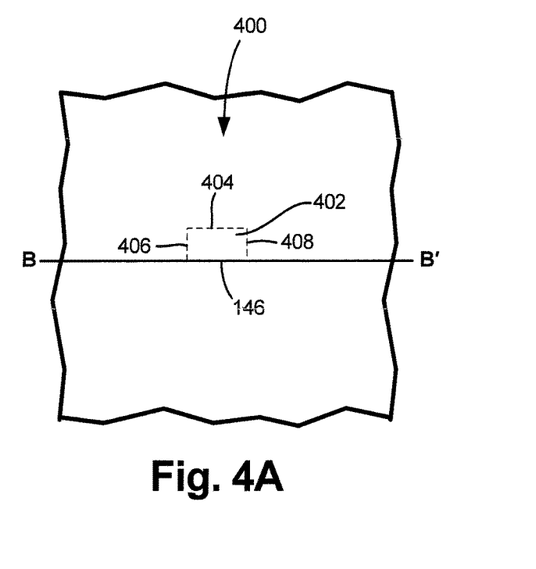
FIG. 4A is a top view of a portion of a wafer including a recording head.
Figure 4B:
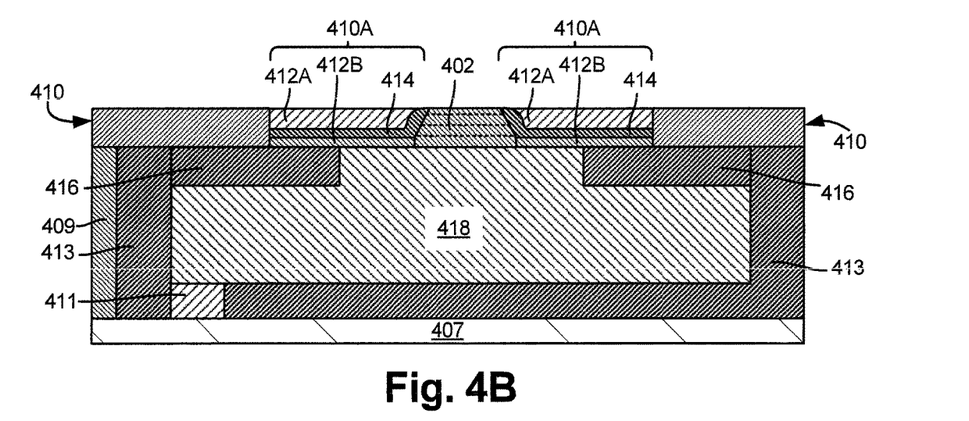
FIG. 4B is a sectional view of the wafer portion of FIG. 4A.

FIG. 4A shows a top view of a wafer portion that includes a recording head 400. Recording head 400 includes a read sensor 402, which is formed by defining four edges: a front and back edge defining a stripe height of the read sensor 402 and side edges defining a width of the sensor 402 (a reader width). The front edge of the read sensor 402 is located at the bearing surface 146 (shown in FIG. 2) and therefore is denoted by the same reference numeral 146 in FIG. 4A. The back edge is denoted by reference numeral 404 and the side edges are denoted by reference numerals 406 and 408. FIG. 4B shows a bearing surface view of the wafer portion of FIG. 4A, which is a sectional view taken along B-B' of wafer portion shown in FIG. 4A.

Referring to FIGS. 4A and 4B, recording head 400 includes read sensor 402 and at least one electrically conductive layer 410 surrounding the read sensor 402. Portions of the electrically conductive layer 410 may include laminated structures having both electrically conductive and insulating layers. For example, portion 410A of layer 410 may include electrically conductive metallic layers 412A and 412B that are separated by an insulation layer 414. In some embodiments, read sensor 402 may be a magnetoresistive sensor that includes a plurality of layers including a free layer or sensing layer, a barrier layer and other layers such as a reference layer and a pinned layer that are antiferromagnetically coupled. Electrically conductive layer 410 provides an electrical path between the read sensor 402 and ground (e.g., a substrate 407 that is at ground potential). A first lead 409 connects the electrically conductive layer 410 to ground 407. As can be seen in FIG. 4B, insulation layer 416 is included below electrically conductive layer 410 and shield material 418 is included below both the read sensor 402 and below insulation layer 416. A second lead 411 connects the shield 418 to ground 407. Element 413 is an insulator. It should be noted that, in some embodiments, metallic layer 412B may be formed of a same material as the read sensor 402 layer to which it is connected.

Referring back to FIG. 4A, to define back edge 404, for example, the wafer portion may be masked by a photoresist layer (not shown) such that the area behind desired stripe height back edge 404 is left open. A material removal process (e.g., milling) is then carried out on the left-open portion to define back edge 404. Stripe height back edge 404 is protected by backfilling the milled area with $Al_2O_3$ or other suitable material, and the photoresist layer is subsequently dissolved. With an intact top electrical connection (including elements 402 and 410) in place during the stripe mill, charge distribution is such that there may be non-uniform $Al_2O_3$ backfill deposition, which may then create a shorting path across the read sensor 402 through the isolation layer 414 or a short across a barrier layer of the read sensor 402. The shorting path is revealed in a subsequent electrical test.

To address possible shorting due to non-uniform backfilling, in embodiments of the disclosure, an isolation structure is formed around the read sensor 402 before the back edge 404 is defined. The isolation structure is formed such that it breaks the electrical connection, which prevents the non-uniform $Al_2O_3$ deposition from occurring during the stripe process which then will not cause shorting (at the subsequent electrical test step). Details regarding a size, shape, location, etc., of an isolation structure in accordance with one embodiment are provided below in connection with FIGS. 5A-6B.

Figure 5A:
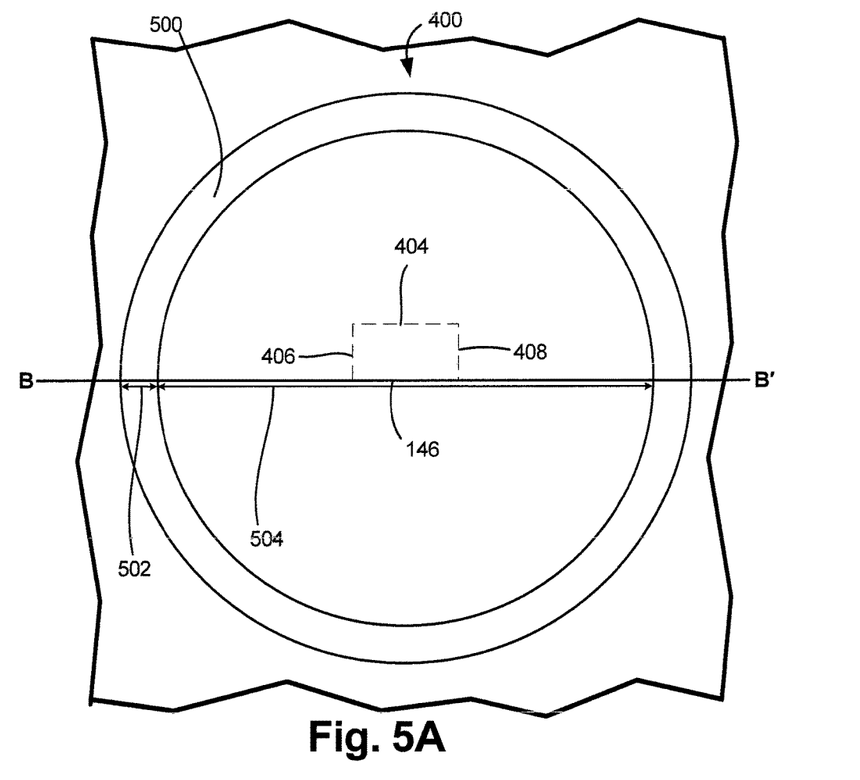
FIG. 5A is a top view of the wafer portion of FIG. 4A with an isolation structure in accordance with one embodiment.

FIG. 5A is a top view showing an isolation structure 500 in accordance with one embodiment, which is formed in the wafer portion that includes recording head 400. In the embodiment of FIG. 5A, isolation structure 500 is a circular (or substantially circular) ring with bearing surface line 146 dividing the isolation ring 500 into two substantially equally sized semicircular portions. However, in other embodiments, isolation structure 500 may have any suitable shape, which may include a substantially oval shape, a substantially hexagonal shape, a substantially pentagonal shape, a substantially rectangular or square shape, a substantially triangular shape, etc. In embodiments of the type shown in FIG. 5A, a width 502 of isolation ring/structure 500 may be between about 3 micrometers (um) and about 10 um and an inner diameter 504 of isolation ring 500 may be between about 20 um and about 80 um. In certain embodiments, the inner diameter 504 of the isolation ring 500 may be greater than 80 um. In a particular embodiment, width 502 of the isolation ring 500 is about 4.5 um and inner diameter 504 of isolation ring 500 is about 70 um. In one embodiment, formation of isolation ring 500 may be carried out by patterning using photolithography and ion milling to define the ring 500. In some embodiments, a substantially circular shape for structure 500 is suitable due to its simplicity and effectiveness in electrically isolating the read sensor 402. In some embodiments, having the width 502 between about 3 um and about 10 um and the inner diameter 504 between about 20 um and about 80 um provides a suitable size for ring 500 to be positioned between the read sensor 402 and read sensor contact pads (not shown) to which external electrical conductors may be connected.

Figure 5B:
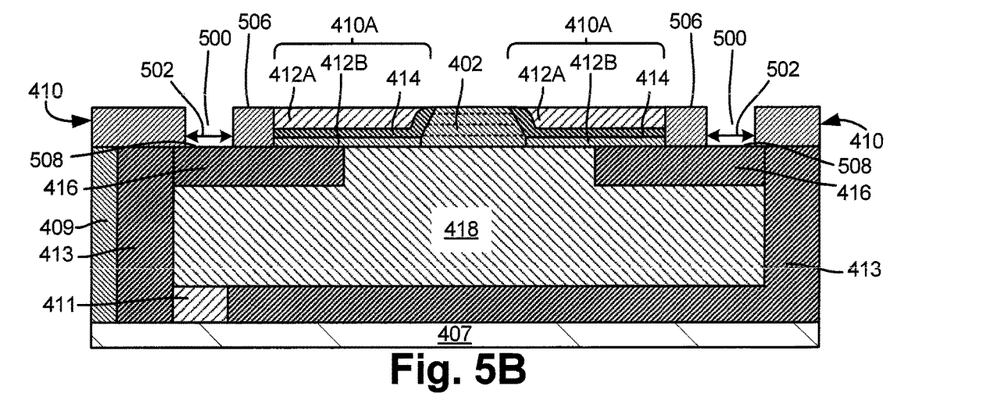
FIG. 5B is a sectional view of the wafer portion of FIG. 5A.

FIG. 5B shows a bearing surface view of the wafer portion of FIG. 5A, which is a sectional view taken along B-B' of wafer portion shown in FIG. 5A. As can be seen in FIG. 5B, isolation ring 500 extends from a top surface 506 of the electrically conductive layer 410 to a top surface 508 of insulator layer 416, thereby breaking the electrical path from the read sensor 402 to ground via the electrically conductive layer 410.

Figure 6A:
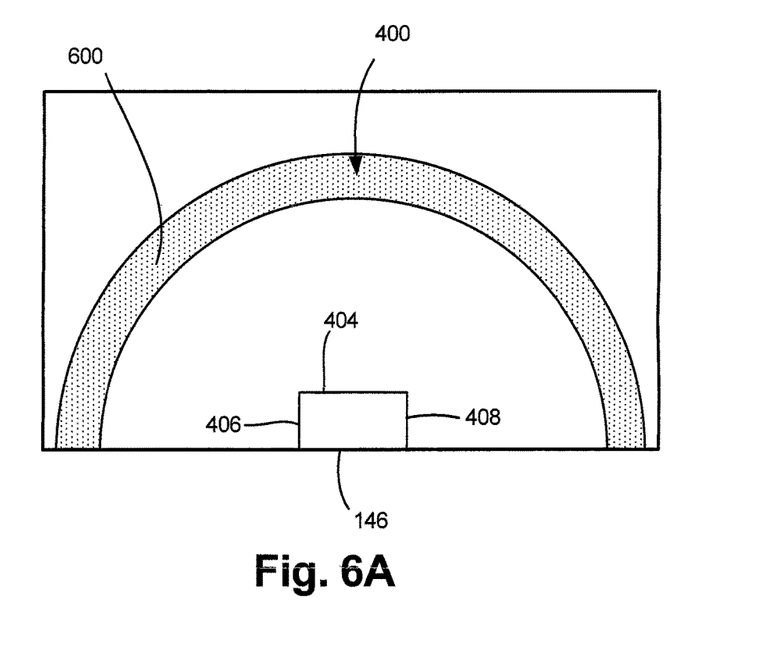
FIG. 6A is a top view of a recording head in accordance with one embodiment.
Figure 6B:
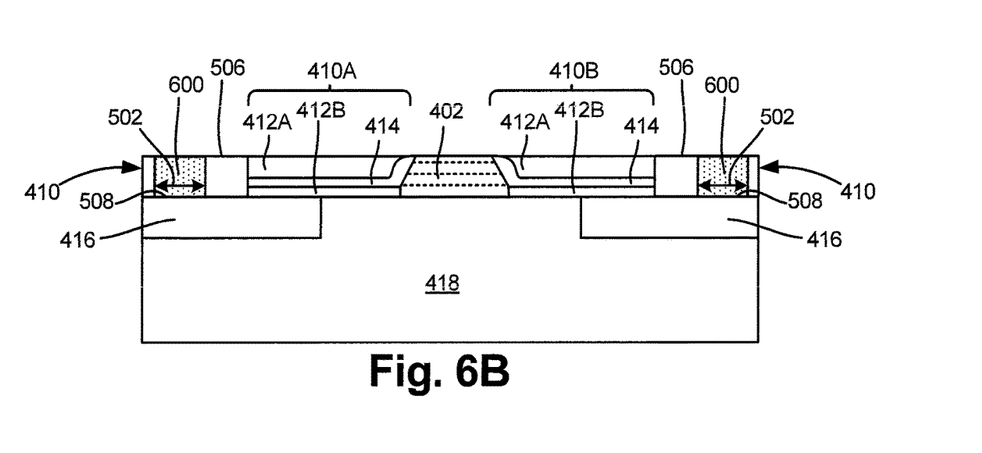
FIG. 6B is a bearing surface view of the recording head of FIG. 6A.

FIG. 6A is a top view of recording head 400 after a lapping operation is carried out to finish the recording head 400 in accordance with one embodiment. FIG. 6B is a bearing surface view of the recording head of FIG. 6A. In the interest of simplification, substrate 407, leads 409 and 411, and insulator 413 are not shown in FIGS. 6A and 6B. As can be seen in FIGS. 6A and 6B, in a finished recording head 400, isolation structure 500 may be filled with a material 600 (e.g., an insulator) and only the semicircular portion of isolation structure 500 behind the bearing surface 146 remains a part of the recording head 400. In certain other embodiments, the isolation structure 500 may be left substantially unfilled in the finished recording head 400. It should be noted that, in some embodiments, the isolation structure 500 may be at least partially filled due to subsequent processing.

Figure 7:
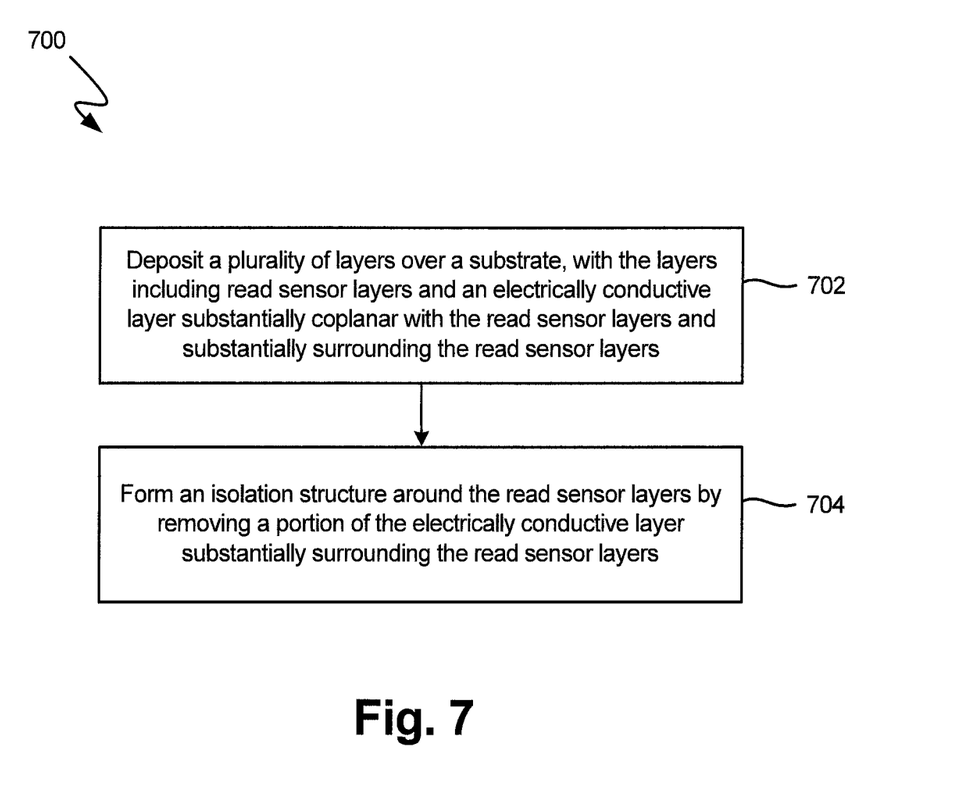
FIG. 7 is a simplified flow diagram of a method embodiment.

FIG. 7 is a simplified flow diagram 700 of a method embodiment. At step 702, a plurality of layers is deposited over a substrate. The layers include read sensor layers and an electrically conductive layer substantially coplanar with the read sensor layers and substantially surrounding the read sensor layers. The electrically conductive layer is in contact with at least one of the read sensor layers. The electrically conductive layer provides an electrical path between the at least one of the read sensor layers and ground. At step 704, an isolation structure is formed around the read sensor layers by removing a portion of the electrically conductive layer substantially surrounding the read sensor layers. The isolation structure is substantially coplanar with the read sensor layers and substantially surrounds the read sensor layers. The isolation structure breaks the electrical path between the at least one of the read sensor layers and the ground.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   depositing a plurality of layers over a substrate, the layers including read sensor layers and an electrically conductive layer substantially coplanar with the read sensor layers and substantially surrounding the read sensor layers, the electrically conductive layer being in contact with at least one of the read sensor layers, the electrically conductive layer providing an electrical path between the at least one of the read sensor layers and ground; and
   forming an isolation structure around the read sensor layers by removing a portion of the electrically conductive layer substantially surrounding the read sensor layers, the isolation structure being substantially coplanar with the read sensor layers and substantially surrounding the read sensor layers, the isolation structure breaking the electrical path between the at least one of the read sensor layers and the ground.

2. The method of claim 1 and wherein the isolation structure is a substantially circular isolation ring.

3. The method of claim 2 and wherein an inner diameter of the substantially circular isolation ring is between about 20 micrometers and about 80 micrometers.

4. The method of claim 1 and wherein the isolation structure is non-circular.

5. The method of claim 1 and wherein a width of the isolation structure is between about 3 micrometers and about 10 micrometers.

6. The method of claim 1 and wherein the plurality of layers further comprises an insulation layer below the electrically conductive layer, and wherein the isolation structure has a depth that extends from a top surface of the electrically conductive layer to a top surface of the insulation layer.

7. The method of claim 6 and wherein the plurality of layers further comprises a shield layer below the read sensor layers and below the insulation layer.

8. The method of claim 1 and wherein at least a portion of the electrically conductive layer is a laminated structure comprising at least two metallic layers separated by an insulation layer.

9. The method of claim 1 and further comprising, after formation of the isolation structure, removing a portion of the read sensor layers surrounded by the isolation structure to define a back edge of a read sensor.

10. A recording head comprising:
    a bearing surface;
    a read sensor having a bearing surface edge, a back edge and side edges;
    an electrically conductive layer; and
    an isolation structure that divides the electrically conductive layer into a first portion that is in contact with the read sensor and a second portion that is separated from the first portion, such that the first portion of the electrically conductive layer is electrically isolated from the second portion of the electrically conductive layer and isolated from the read sensor,
    wherein the isolation structure is semi-circular in shape and is positioned around the side edges and the back edge of the read sensor.

11. The recording head of claim 10 and wherein isolation structure is about 4.5 micrometers wide.

12. The recording head of claim 10 and further comprising an insulation layer below the electrically conductive layer, and wherein the isolation structure has a depth that extends from a top surface of the electrically conductive layer to a top surface of the insulation layer.

13. The recording head of claim 12 and further comprising a shield layer below the read sensor and below the insulation layer.

14. The recording head of claim 10 and wherein the first portion of the electrically conductive layer comprises a laminated structure having at least two metallic layers separated by an insulation layer.

15. A method of forming a recording head comprising:
    forming a read sensor;
    forming an electrically conductive layer around the read sensor; and
    forming a substantially circular isolation ring that divides the electrically conductive layer into a first portion that is in contact with the read sensor and a second portion that is separated from the first portion, such that the first portion of the electrically conductive layer is electrically isolated from the second portion of the electrically conductive layer and isolated from the read sensor.

16. The method of claim 15 and wherein an inner diameter of the substantially circular isolation ring is between about 20 micrometers and about 80 micrometers.

17. The method of claim 15 and wherein a width of the substantially circular isolation ring is between about 3 micrometers and about 10 micrometers.

* * * * *